United States Patent
Li

(10) Patent No.: US 7,796,363 B2
(45) Date of Patent: Sep. 14, 2010

(54) PZT ELEMENT, HEAD GIMBAL ASSEMBLY, AND DISK DRIVE UNIT WITH SAME

(75) Inventor: Hanhui Li, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 210 days.

(21) Appl. No.: 11/440,354

(22) Filed: May 25, 2006

(65) Prior Publication Data

US 2007/0274008 A1 Nov. 29, 2007

(51) Int. Cl.
G11B 5/56 (2006.01)
H01L 41/08 (2006.01)

(52) U.S. Cl. .................................. 360/294.4; 310/328
(58) Field of Classification Search ............... 360/294.4; 29/25.35; 310/328, 348; 369/222
See application file for complete search history.

(56) References Cited

U.S. PATENT DOCUMENTS

| | | | |
|---|---|---|---|
| 4,868,447 A * | 9/1989 | Lee et al. ..................... | 310/328 |
| 5,299,081 A | 3/1994 | Hatch et al. | |
| 5,611,707 A | 3/1997 | Meynier | |
| 5,636,089 A | 6/1997 | Jurgenson et al. | |
| 5,898,544 A | 4/1999 | Krinke et al. | |
| 6,198,606 B1 | 3/2001 | Boutaghou et al. | |
| 6,362,542 B1 * | 3/2002 | Novotny ................. | 310/12.03 |
| 6,538,836 B1 | 3/2003 | Dunfield et al. | |
| 6,590,748 B2 * | 7/2003 | Murphy et al. ........... | 360/294.4 |
| 6,617,763 B2 | 9/2003 | Mita et al. | |
| 6,624,984 B2 | 9/2003 | Lewis et al. | |
| 6,671,131 B2 | 12/2003 | Kasajima et al. | |
| 6,700,727 B1 | 3/2004 | Crane et al. | |
| 6,700,749 B2 | 3/2004 | Shiraishi et al. | |
| 6,950,266 B1 | 9/2005 | McCaslin et al. | |
| 7,068,474 B2 * | 6/2006 | Kuwajima et al. ....... | 360/294.4 |
| 7,119,994 B2 * | 10/2006 | Miyano et al. ........... | 360/294.4 |
| 7,225,513 B2 * | 6/2007 | Yao et al. .................. | 29/25.35 |
| 7,247,973 B2 * | 7/2007 | Hida et al. ................. | 310/328 |
| 7,282,836 B2 * | 10/2007 | Kwon et al. ............... | 310/328 |
| 2002/0097663 A1 * | 7/2002 | O'Neill ....................... | 369/222 |
| 2003/0133230 A1 * | 7/2003 | Hida et al. ................ | 360/294.4 |
| 2003/0147177 A1 | 8/2003 | Yao et al. | |

(Continued)

FOREIGN PATENT DOCUMENTS

JP 10-225146 8/1998

(Continued)

OTHER PUBLICATIONS

U.S. Appl. No. 11/238,998, filed Sep. 2005, Yang et al.

(Continued)

*Primary Examiner*—Brian E Miller
(74) *Attorney, Agent, or Firm*—Nixon & Vanderhye, P.C.

(57) ABSTRACT

A PZT element of the present invention includes a laminated structure which is laminated with electrode layer and PZT layer alternatively to define a thickness direction; wherein each PZT layer is sandwiched between two adjacent electrode layers; and at least one support element provided on a side portion of the laminated structure and substantially extending along a longitudinal direction thereof; wherein the PZT element is bent at least towards a latitudinal direction thereof when being applied an electrical voltage thereon through the electrode layers. The invention also discloses a method of manufacturing the PZT element, a HGA and disk drive unit with the same.

10 Claims, 12 Drawing Sheets

U.S. PATENT DOCUMENTS

| | | | |
|---|---|---|---|
| 2003/0147181 A1 | 8/2003 | Shiraishi et al. | |
| 2003/0168935 A1 | 9/2003 | Ogawa et al. | |
| 2003/0231434 A1* | 12/2003 | Mita et al. | 360/294.4 |
| 2004/0120081 A1* | 6/2004 | Kurihara et al. | 360/294.4 |
| 2006/0023338 A1 | 2/2006 | Sharma et al. | |
| 2006/0044699 A1* | 3/2006 | Hirano et al. | 360/294.4 |
| 2006/0050442 A1 | 3/2006 | Yao et al. | |
| 2006/0072247 A1 | 4/2006 | Yao et al. | |
| 2006/0082917 A1 | 4/2006 | Yao et al. | |
| 2006/0098347 A1 | 5/2006 | Yao et al. | |
| 2006/0146449 A1 | 7/2006 | Yao et al. | |
| 2007/0109689 A1* | 5/2007 | Yao | 360/294.4 |
| 2007/0165333 A1* | 7/2007 | Kwon et al. | 360/294.4 |

FOREIGN PATENT DOCUMENTS

| | | |
|---|---|---|
| JP | 2002-74871 | 3/2002 |
| JP | 2002-133803 | 5/2002 |

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.

* cited by examiner

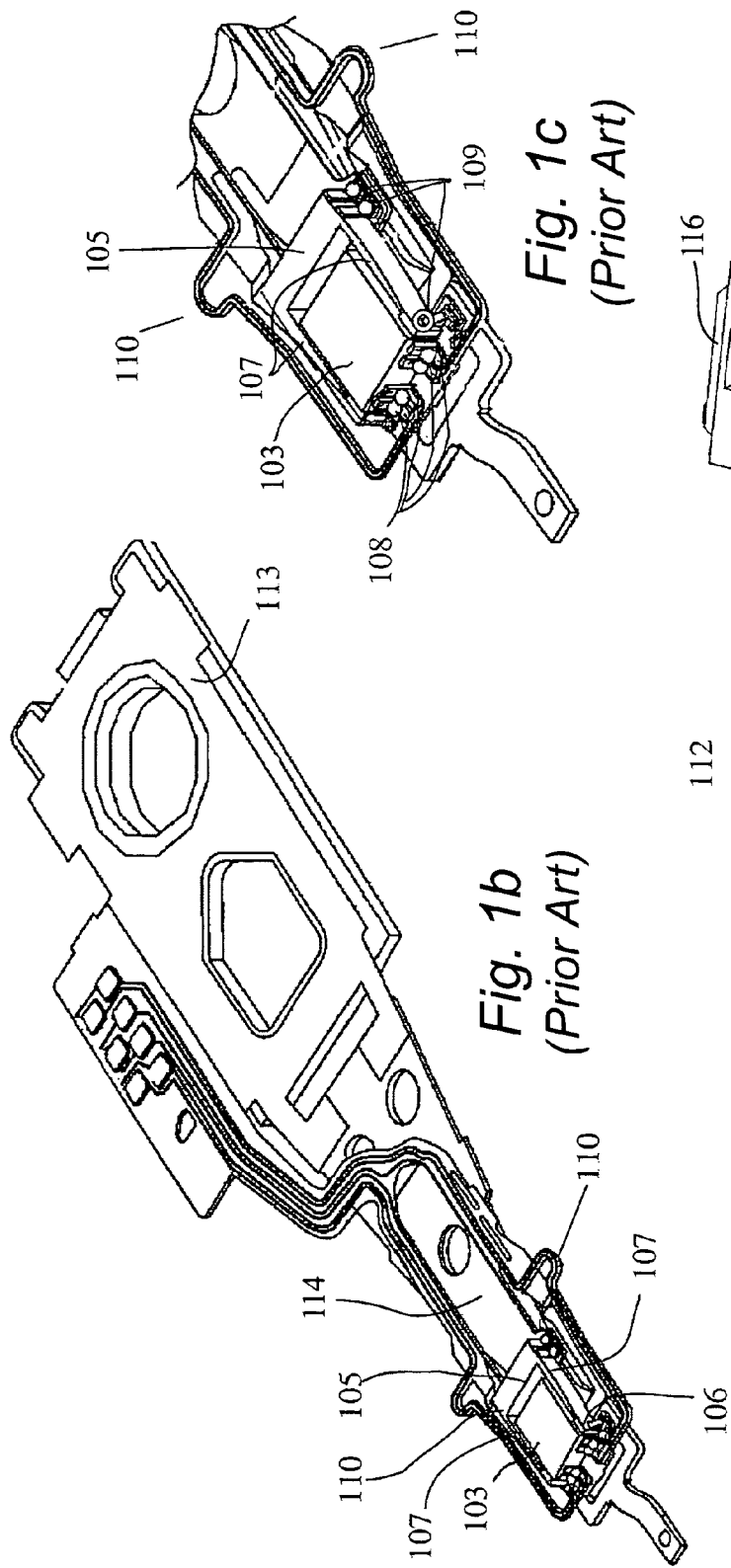
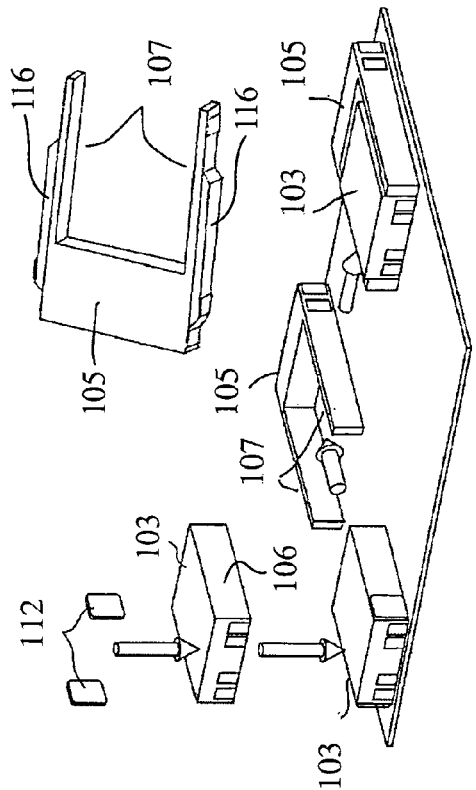
Fig. 1b (Prior Art)
Fig. 1c (Prior Art)
Fig. 1d (Prior Art)

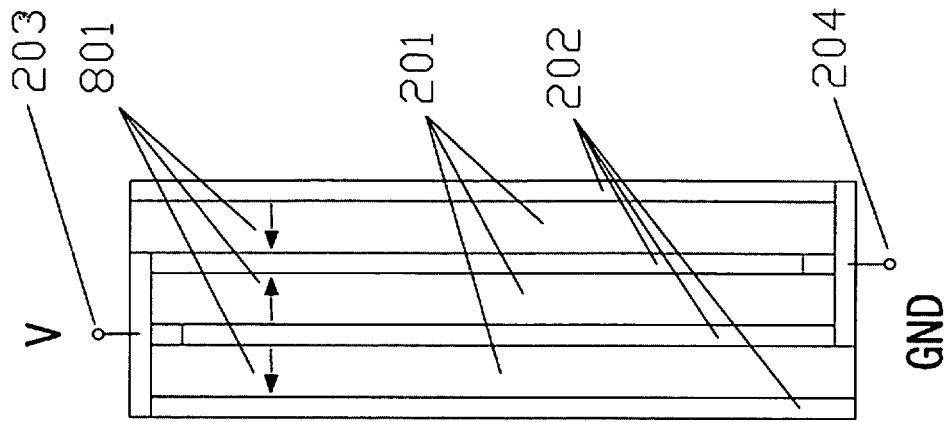
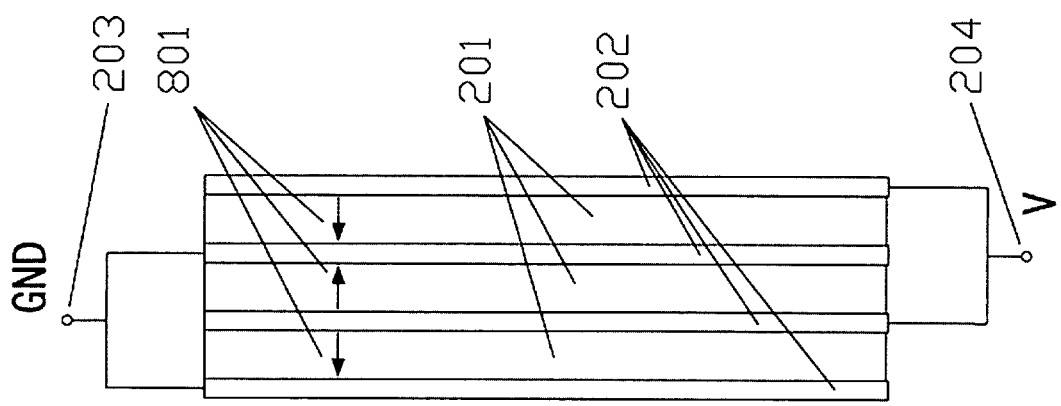
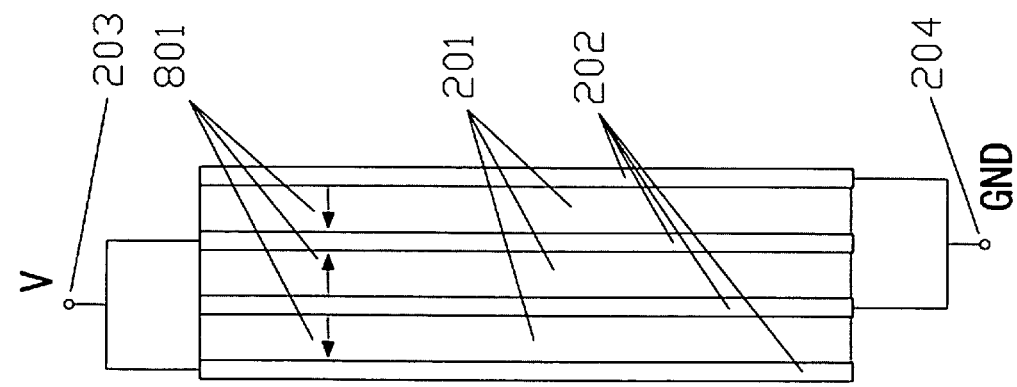
Fig. 10c
Fig. 10b
Fig. 10a

PZT ELEMENT, HEAD GIMBAL ASSEMBLY, AND DISK DRIVE UNIT WITH SAME

FIELD OF THE INVENTION

This invention generally relates to disk drive unit, and more particularly to PZT element used for disk drive unit and its manufacturing method.

BACKGROUND OF THE INVENTION

One known type of information storage device is a disk drive device that uses magnetic media to store data and a movable read/write head that is positioned over the magnetic media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, which works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the speed and fine tuning the position of the read/write head over the desired tracks on high density storage media. Such dual-stage actuator systems typically include a primary voice-coil motor (VCM) actuator and a secondary micro-actuator, such as a PZT micro-actuator. The VCM actuator is controlled by a servo control system that rotates the actuator arm that supports the read/write head to position the read/write head over the desired information track on the storage media. The PZT micro-actuator is used in conjunction with the VCM actuator for the purpose of increasing the positioning speed and fine tuning the exact position of the read/write head over the desired track. Thus, the VCM actuator makes larger adjustments to the position of the read/write head, while the PZT micro-actuator makes smaller adjustments that fine tune the position of the read/write head relative to the storage media. In conjunction, the VCM actuator and the PZT micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803, entitled "Micro-actuator and HGA" and JP 2002-074871, entitled "Head Gimbal Assembly Equipped with Actuator for Fine Position, Disk Drive Equipped with Head Gimbals Assembly, and Manufacture Method for Head Gimbal Assembly."

FIG. 1a illustrates a portion of a conventional disk drive unit and shows a magnetic disk 101 mounted on a spindle motor 102 for spinning the disk 101. A voice coil motor arm 104 carries a HGA 100 that includes a micro-actuator 105 and a read/write head 103. A voice-coil motor (VCM) is provided for controlling the motion of the motor arm 104 and, in turn, controlling the slider 103 to move from track to track across the surface of the disk, thereby enabling the read/write head to read data from or write data to the disk. In operation, a lift force is generated by the aerodynamic interaction between the slider, incorporating the read/write head, and the spinning magnetic disk. The lift force is opposed by equal and opposite spring forces applied by a suspension of the HGA such that a predetermined flying height above the surface of the spinning disk is maintained over a full radial stroke of the motor arm 104.

FIG. 1b illustrates the head gimbal assembly 100 (HGA) of the conventional disk drive device of FIG. 1a incorporating a dual-stage actuator. However, because of the inherent tolerances of the VCM and the head suspension assembly, the slider 103 cannot achieve quick and fine position control which adversely impacts the ability of the read/write head to accurately read data from and write data to the disk. As a result, a PZT micro-actuator 105, as described above, is provided in order to improve the positional control of the slider and the read/write head. More particularly, the PZT micro-actuator 105 corrects the displacement of the slider 103 on a much smaller scale, as compared to the VCM, in order to compensate for the resonance tolerance of the VCM and head suspension assembly. The micro-actuator 105 enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator 105 enables the disk drive device to have a significant increase in the surface recording density of the information storage disks used therein.

As shown in FIGS. 1a and 1b, one known type of micro-actuator is a U-shaped micro-actuator 105. This U-shaped micro-actuator 105 has two side arms 107 that hold the slider 103 therebetween and displace the slider by movement of the side arms.

Referring more particularly to FIG. 1c, a conventional PZT micro-actuator 105 includes a ceramic U-shaped frame which has two ceramic beams or side arms 107 each having a PZT element thereon. With reference to FIGS. 1b and 1c, the PZT micro-actuator 105 is physically coupled to a flexure 114. FIG. 1d generally shows an exemplary process for assembling the slider 103 with the micro-actuator 105. As shown in FIGS. 1d and 2, the slider 103 is partially bonded with the two ceramic beams 107 at two predetermined positions 106 by epoxy 112. This bonding makes the movement of the slider 103 dependent on the movement of the ceramic beams 107 of the micro-actuator 105. A PZT element 116 is attached on each of the ceramic beams 107 of the micro-actuator to enable controlled movement of the slider 103 through excitation of the PZT elements. More particularly, when power is supplied through the suspension traces 110, the PZT elements expand or contract to cause the two ceramic beams 107 of the U-shape micro-actuator frame to deform, thereby making the slider 103 move on the track of the disk in order to fine tune the position of the read/write head. In this manner, controlled displacement of slider 103 can be achieved for fine positional tuning.

FIG. 1e illustrates the micro-actuator and slider after being assembled as shown in FIG. 1d. FIGS. 1e and 2 also show the two possible translational movements, illustrated by arrows 117a and 117b, that the micro-actuator can produce upon excitation, as well as the resulting reaction forces (118a and 118b, respectively) generated in the base-part plate of the micro-actuator as a result of the translational movement.

However, referring to FIG. 2, when being applied an electrical voltage thereon, the PZT element 116 only produces a bending displacement substantially along its thickness direction which is perpendicular to electrode layers 171 and PZT layer 172 of the PZT element 116, but cannot produces a bending displacement along its width direction (or latitudinal direction) which is parallel to electrode layers 171 and PZT layer 172 of the PZT element 116. This greatly limits the application scope of the PZT element 116.

Hence, it is desired to provide a PZT element and manufacturing method thereof to solve the above-mentioned problem.

BRIEF DESCRIPTION OF THE INVENTION

A main feature of the present invention is to provide a PZT element which can produce a bending displacement along its latitudinal direction.

Another feature of the present invention is to provide a HGA and disk drive unit with a PZT element which can produce a bending displacement along its latitudinal direction.

A further feature of the present invention is to provide a manufacturing method of a PZT element which can produce a bending displacement along its latitudinal direction.

To attain the above features, a PZT element of the invention comprises a laminated structure which is laminated with electrode layer and piezoelectric layer alternatively to define a thickness direction; wherein each piezoelectric layer is sandwiched between two adjacent electrode layers; and at least one support element provided on a side portion of the laminated structure and substantially extending along a longitudinal direction thereof; wherein the piezoelectric element is bent at least towards a latitudinal direction thereof when being applied an electrical voltage thereon through the electrode layers.

In an embodiment of the invention, the support element is provided on a side surface of the laminated structure, which is parallel to the thickness direction of the piezoelectric element. In a further embodiment, the support element comprises an insulative layer and a support layer provided on the insulative layer; and the insulative layer is sandwiched between the support layer and the laminated structure. In a still embodiment, the laminated structure may further comprise at least one notch or slot therein for bending piezoelectric element easily.

A HGA of the invention comprises a slider; a PZT element; and a suspension to support the slider and the piezoelectric element; wherein the piezoelectric element comprises: a laminated structure which is laminated with electrode layer and PZT layer alternatively to form a thickness direction; wherein each PZT layer is sandwiched between two of the electrode layer; and at least one support element provided on one side portion of the laminated structure and substantially extending along a longitudinal direction thereof; wherein the PZT element is sandwiched between the slider and the suspension, and bent at least towards a latitudinal direction thereof when being applied an electrical voltage thereon through the electrode layers.

In the invention, a method of manufacturing a PZT element comprising the following steps: 1) forming a laminated structure by laminating electrode layer and PZT layer alternatively in a thickness direction so as to make each PZT layer being sandwiched between two adjacent electrode layers; 2) attaching at least one support element on a side portion of the laminated structure to make the at least one support element substantially extend along a longitudinal direction of the laminated structure.

A disk drive unit of the invention comprises a HGA; a drive arm to connect with the HGA; a disk; and a spindle motor to spin the disk; wherein the HGA comprising: a slider; a PZT element; and a suspension to support the slider and the PZT element; wherein the PZT element comprises: a laminated structure which is laminated with electrode layer and PZT layer alternatively to form a thickness direction; wherein each PZT layer is sandwiched between two of the electrode layer; and at least one support element provided on one side portion of the laminated structure and substantially extending along a longitudinal direction thereof; wherein the PZT element is sandwiched between the slider and the suspension, and bent at least towards a latitudinal direction thereof when being applied an electrical voltage thereon through the electrode layers.

For the purpose of making the invention easier to understand, several particular embodiments thereof will now be described with reference to the appended drawings in which:

BRIEF DESCRIPTION OF THE DRAWINGS

FIG. 1b is a perspective view of a conventional HGA;

FIG. 1c is an enlarged, partial view of the HGA of FIG. 1b;

FIG. 1d illustrates a general process of inserting a slider into the micro-actuator of the HGA of FIG. 1b;

FIG. 3b is a perspective view from another angle of the PZT element shown in FIG. 3a;

FIG. 3c is an exploded view of the PZT element shown in FIG. 3a;

FIG. 10a is a schematic view of an electrical connection of the PZT element shown in FIG. 3a;

FIG. 10b is a schematic view of another electrical connection of the PZT element shown in FIG. 3a;

FIG. 10c illustrates a connection structure between electrode layers of the PZT element according to an embodiment of the invention;

FIG. 11 illustrates an operating state of the piezoelectric element shown in FIG. 3a.

DETAILED DESCRIPTION OF THE INVENTION

Figure 1A:
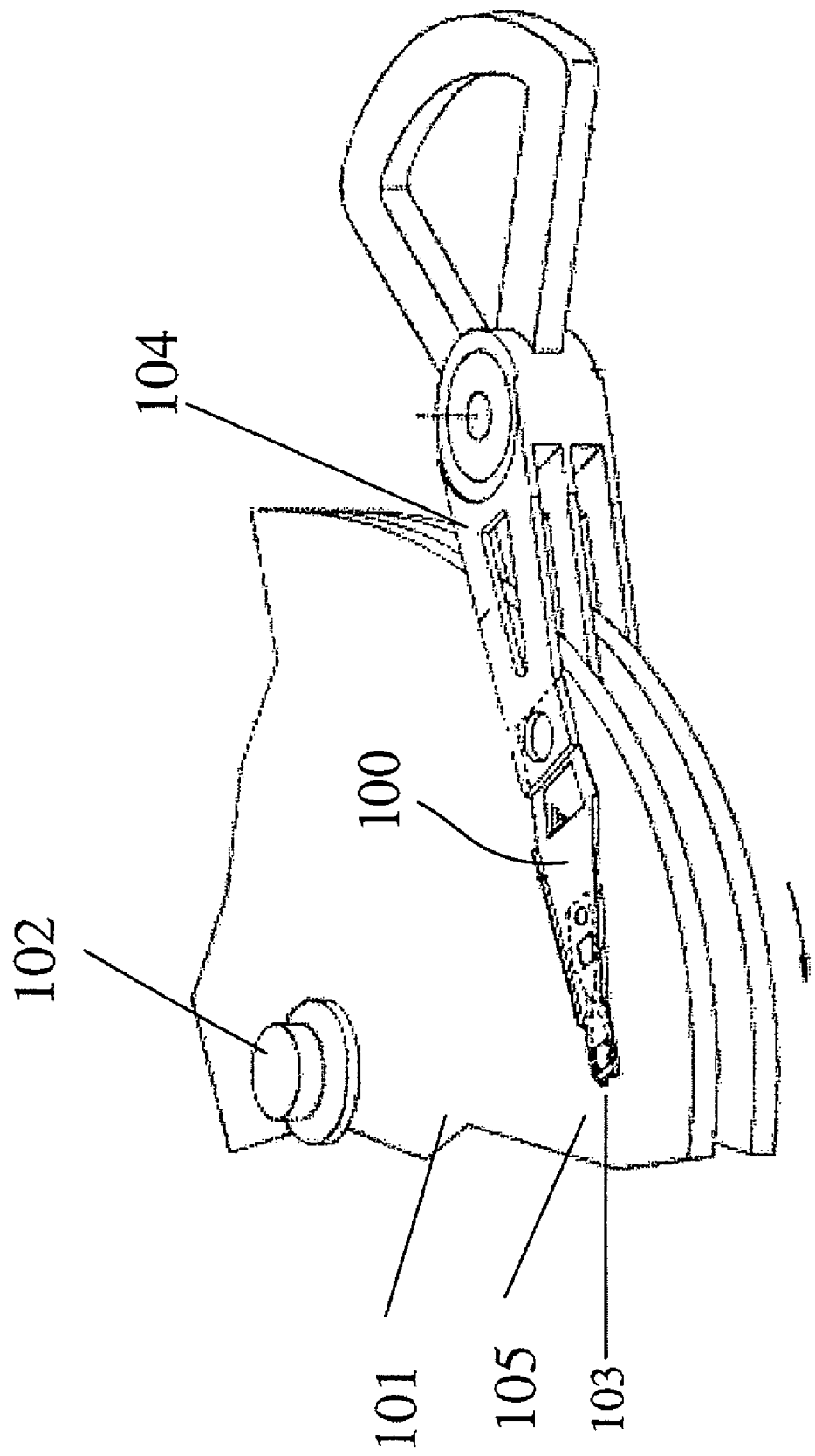
FIG. 1a shows a partial view of a conventional disk drive unit.
Figure 1E:
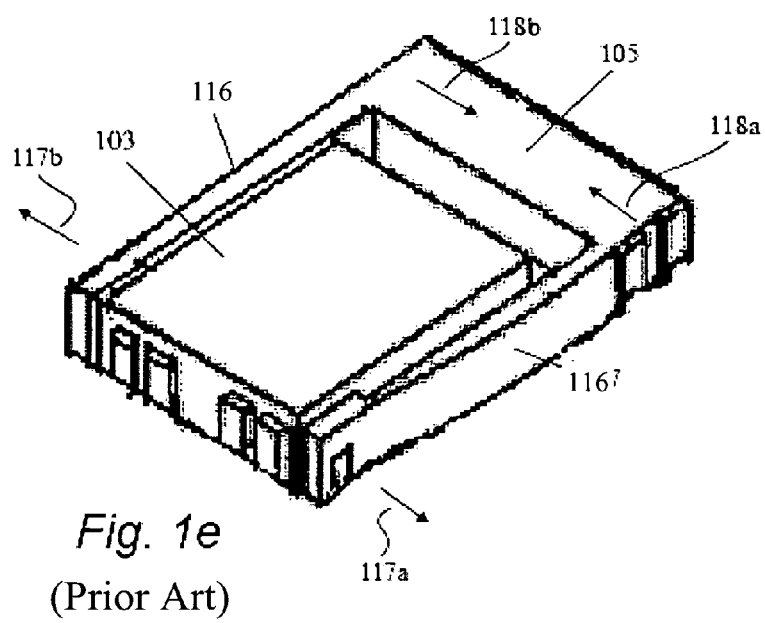
FIG. 1e shows an assembled micro-actuator and slider of the prior art.
Figure 2:
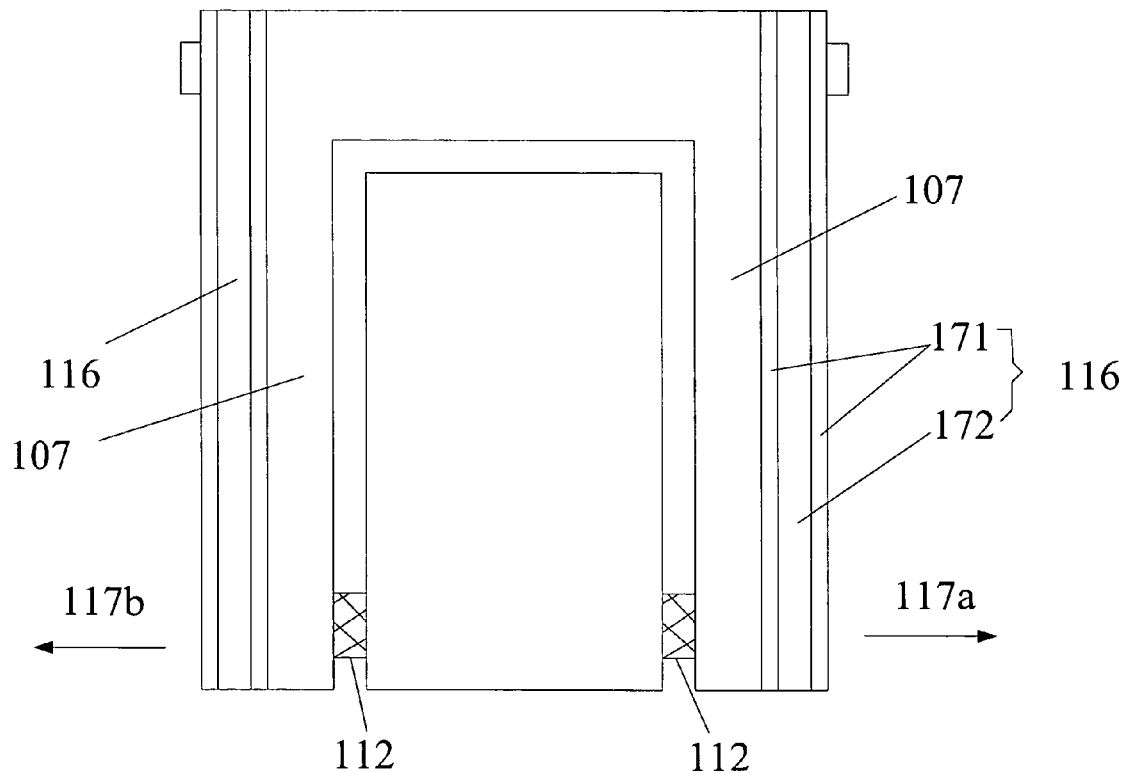
FIG. 2 is a top view of FIG. 1e to show a bending direction of a PZT element.

Various preferred embodiments of the instant invention will now be described with reference to the FIGS. 3-13, wherein like reference numerals designate similar parts throughout the various views. As indicated above, the instant invention is to provide a PZT element which comprises: a laminated structure which is laminated with electrode layer and piezoelectric layer alternatively to define a thickness direction; wherein each piezoelectric layer is sandwiched between two adjacent electrode layers; and at least one support element provided on a side portion of the laminated structure and substantially extending along a longitudinal direction thereof; wherein the piezoelectric element is bent at least towards a latitudinal direction thereof when being applied an electrical voltage thereon through the electrode layers. In the present invention, the PZT element gets a special bending direction which is parallel to the electrode layer and the piezoelectric layer by the at least one support element provided on the side portion of the laminated structure. That is to say, the PZT element can be used for displacing an object, such as a slider along the bending direction which is parallel to the electrode layer and the piezoelectric layer.

Figure 3A:
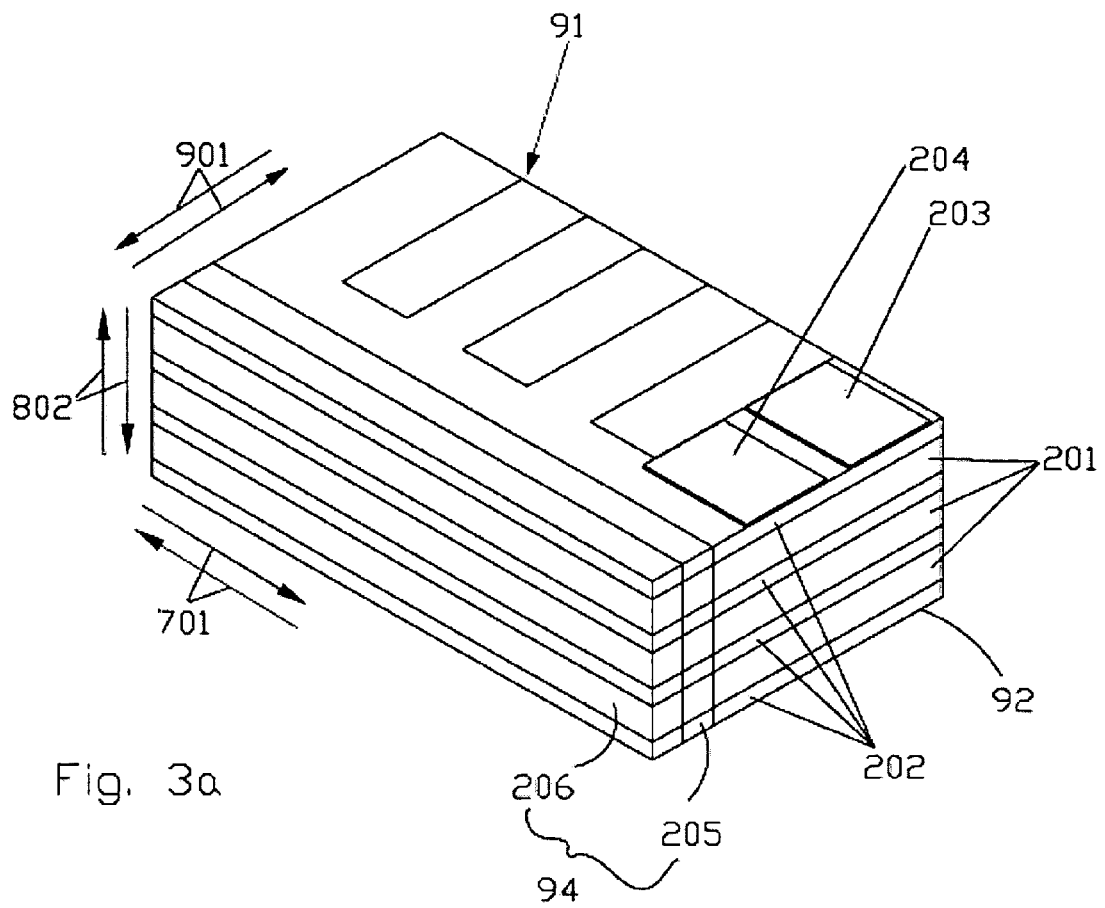
FIG. 3a is a perspective view of a PZT element according to a first embodiment of the invention.
Figure 3B:
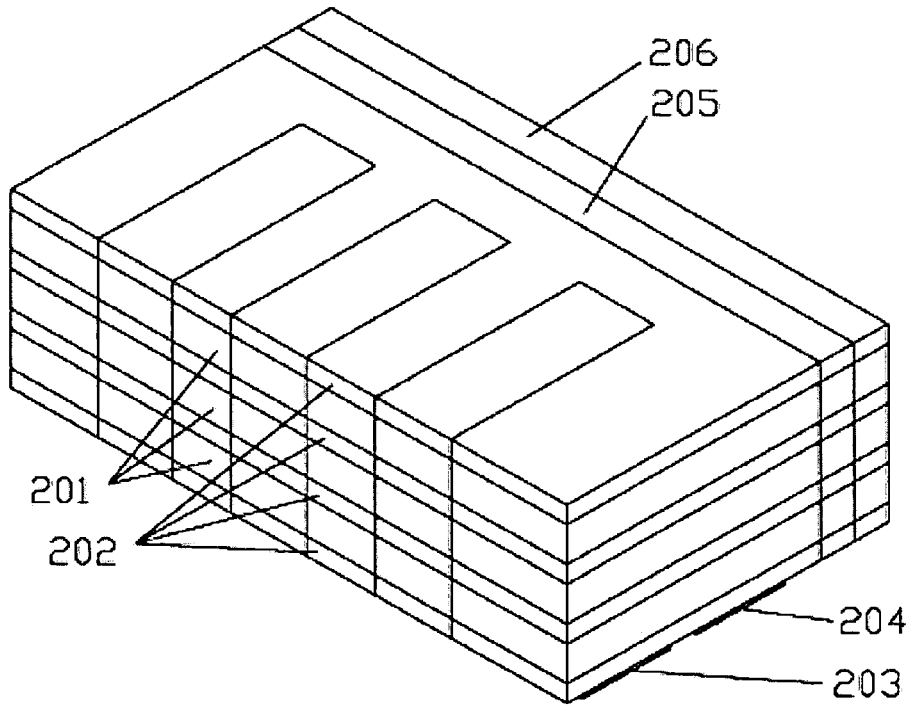
Figure 3C:
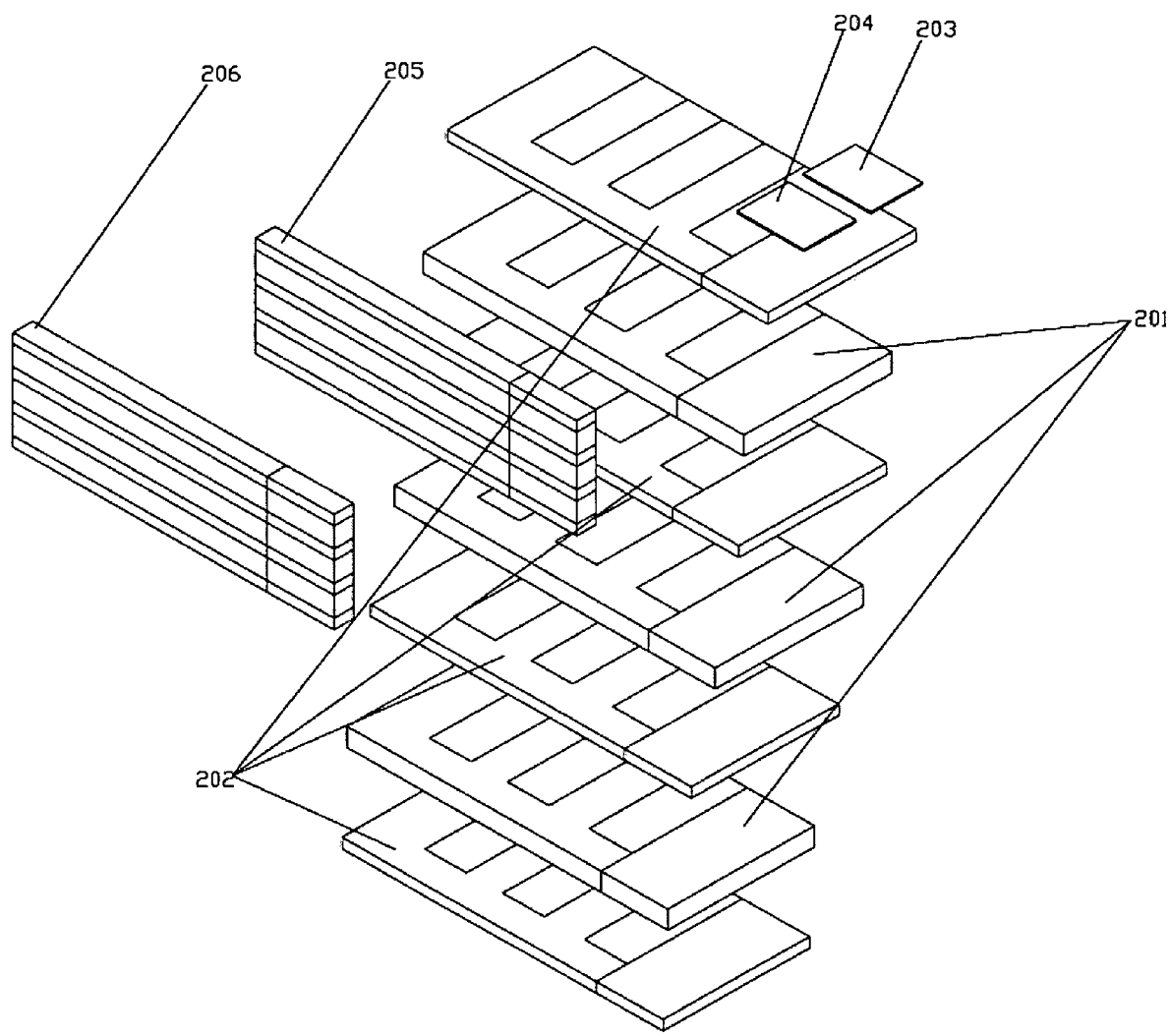

According to an exemplary embodiment of the invention, referring to FIGS. 3a-3c, a PZT element 90a includes a laminated structure 91 and a support element 94. The laminated structure 91 is formed by alternatively laminating electrode layer and PZT layer, such as laminating four electrode layers 202 and three PZT layers 201. Thus, each of the PZT layers 201 is sandwiched between two adjacent electrode layers 202 for being applied with an exciting voltage. In an exemplary embodiment of the invention, a thin film process, such as coating and/or photo masking process, which is rather simple and has a lower cost, may be used to forming the PZT layers 201 of the laminated structure 91 layer by layer. Also, a plurality of conductive terminals, such as two conductive terminals 203, 204 can be provided on one end of the outer electrode layer 202 for applying a voltage on the PZT element 90a thereby.

Referring to FIG. 3a, the PZT element 90a defines a length direction 701, a thickness direction 802, and a width direction 901 which are perpendicular to each other. In an exemplary embodiment of the invention, all the PZT layers 201 have a same thickness, which are substantially identical in structure. Referring to FIG. 10a, each PZT layer 201 also has a polarized direction 801 formed by a magnetizing process, and may be magnetized before or after forming the laminated structure 91. In an embodiment of the invention, the adjacent PZT layers 201 have reverse polarized directions.

Referring to FIG. 3a, the electrode layers 202 are made of conductive material, such as copper, gold, or other suitable materials having good electrical conductivity. The electrode layers 202 are substantially same as the PZT layer 201 in size for covering the entire surface of the PZT layer 201. In an embodiment of the invention, all the electrode layers 202 have an even thickness, which have a substantially identical structure.

Also referring to FIG. 3a, the two conductive terminals 203, 104 are electrically isolated with each other, and are electrically connected with two adjacent electrode layers 202 respectively, which sandwich the PZT layer 201 therebetween. As such, when the two conductive terminals 203, 204 are respectively connected with external power supplier (not shown), an electrical voltage is then applied on each of the PZT layers 201 to make it expand or shrink.

Referring to FIG. 3a, the support element 94 is provided on a side portion of the laminated structure 91 and substantially extending along a longitudinal direction thereof, which is parallel to the length direction 701. In an embodiment of the invention, the support element 94 includes an insulative layer 205 and a support layer 206 provided on the insulative layer 205. In an embodiment, the support layer 206 may be conductive, which may be made from stainless steel, silicon, copper alloy, or other suitable conductive materials. When the support element 94 is mounted on the laminated structure 91, the insulative layer 205 is sandwiched between the support layer 206 and the laminated structure 91 so as to prevent the conductive support layer 206 from contacting with the laminated structure 91 electrically, thus eliminating short circuit issue caused thereby.

In another embodiment of the invention, the support layer 206 may be made of a suitable non-conductive material, in this case, the insulative layer 205 may be omitted from the support element 94.

Figure 4:
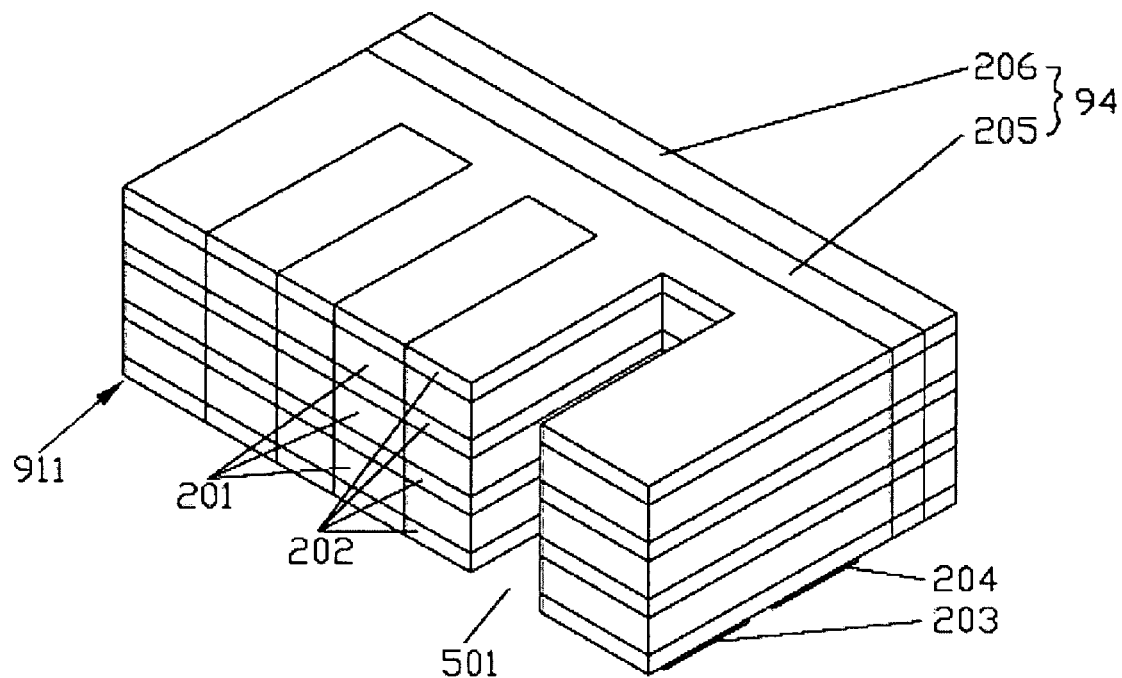
FIG. 4 is a perspective view of a PZT element according to a second embodiment of the invention.
Figure 5:
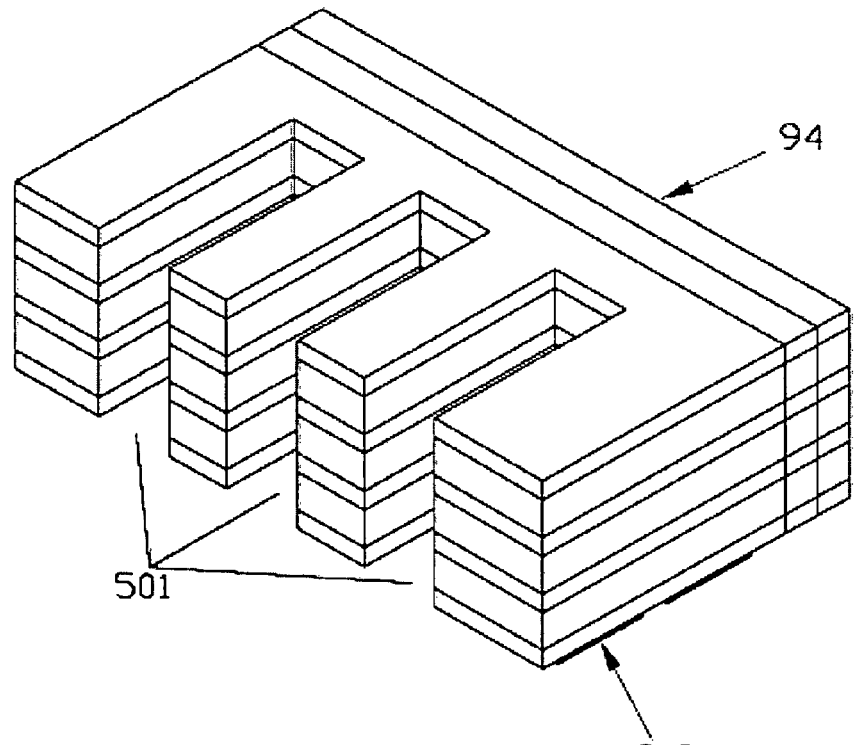
FIG. 5 is a perspective view of a PZT element according to a three embodiment of the invention.

FIGS. 4-5 illustrate two alternative PZT elements 90b, 90c applicable to the invention. Referring to FIG. 4, the PZT elements 90b has a substantially similar structure to the PZT element 90a shown in FIG. 3a, however, which comprises a laminated structure 911 with one notch 501 formed therein for easily bending the piezoelectric element 90b. In the embodiment, the notch 501 is substantially rectangular in shape, but not limited to the shape, any suitable shape may be applicable to the notch. Referring to FIG. 5, the PZT element 90c may comprise a laminated structure 912 with three notches 501 formed therein for bending the PZT element 90c easier. Understandably, any suitable number of the notches 501 may be formed in the laminated structure of the PZT element of the invention. Also, in the invention, the notch 501 may be replaced with slot or other suitable structure for bending the PZT element of the invention easily.

Figure 6:
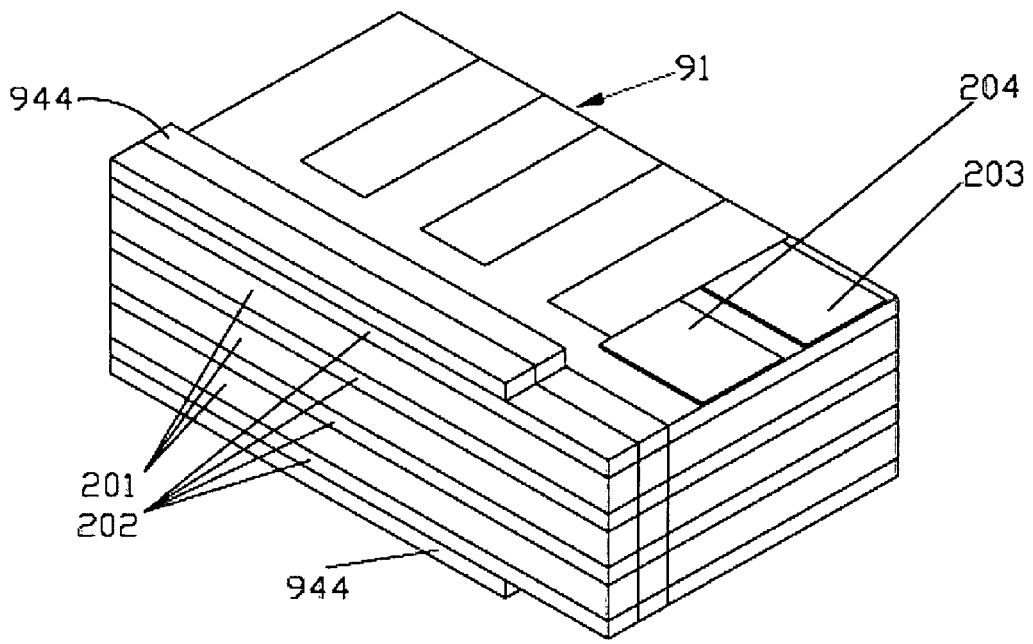
FIG. 6 is a perspective view of a PZT element according to a four embodiment of the invention.

FIG. 6 illustrates an alternative PZT element 90d according to a further embodiment of the invention. The PZT element 90d has a substantially similar structure to the PZT element 90a as shown in FIG. 3a. Differently, instead of one support element 94, two support elements 944 are provided on an upper surface and a lower surface of a side portion of the laminated structure 91, which is parallel to the electrode layers 202 and the PZT layers 201 of the laminated structure 91.

Figure 7:
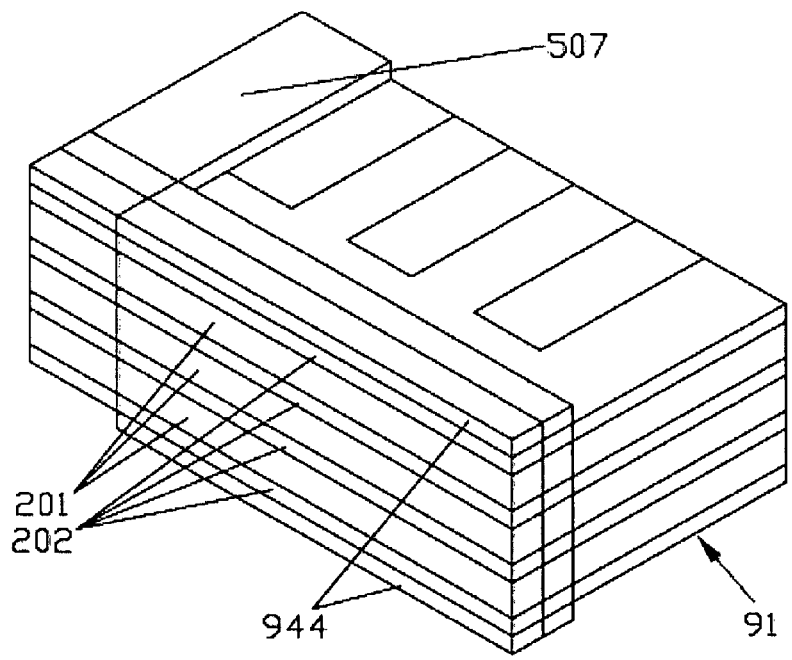
FIG. 7 is a perspective view of a PZT element according to a five embodiment of the invention.

FIG. 7 illustrates still an alternative PZT element 90e according to another embodiment of the invention. The PZT element 90e has a substantially similar structure to the PZT element 90d as shown in FIG. 6. Differently, a fixing portion 507 is formed on an end of the laminated structure 91 thereof, which is configured to mount the PZT element 90e onto a rigid support part, such as a suspension 30 (shown in FIG. 12).

Figure 8:
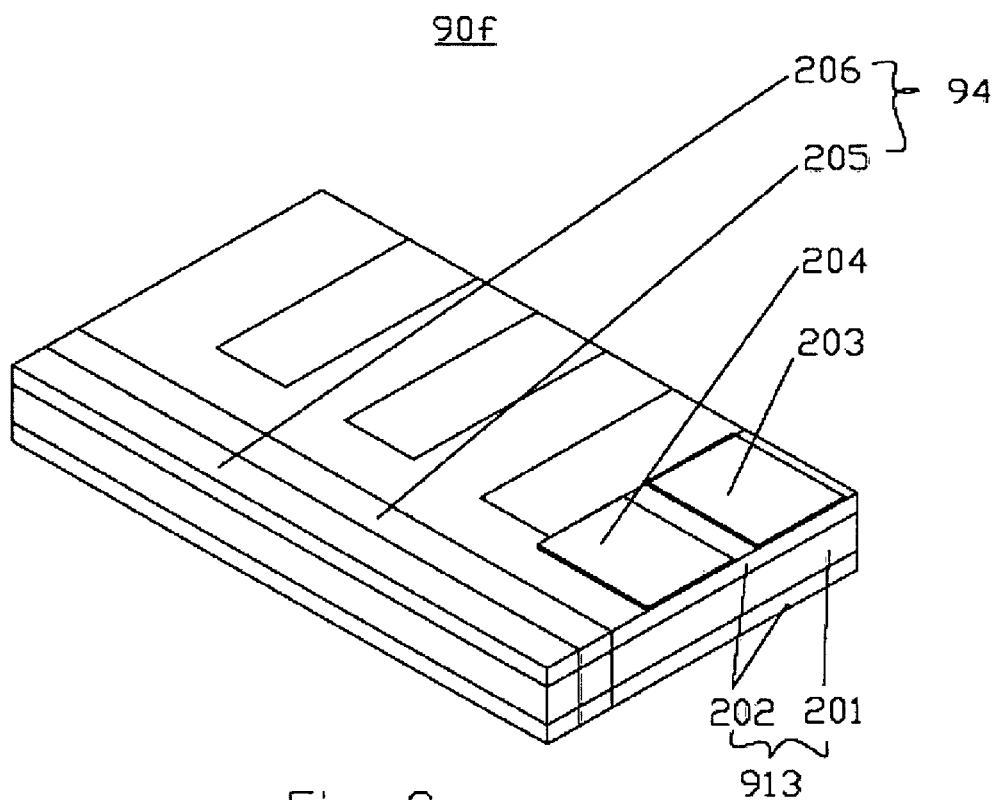
FIG. 8 is a perspective view of a PZT element according to a six embodiment of the invention.

FIG. 8 illustrates still an alternative PZT element 90f according to an embodiment of the invention. The PZT element 90f comprises a laminated structure 913 which is formed by alternatively laminating two electrode layers 202 and one PZT layer 201. The support element 94, which comprises the insulative layer 205 and the support layer 206, is attached on a side portion of the laminated structure 913.

Figure 9:
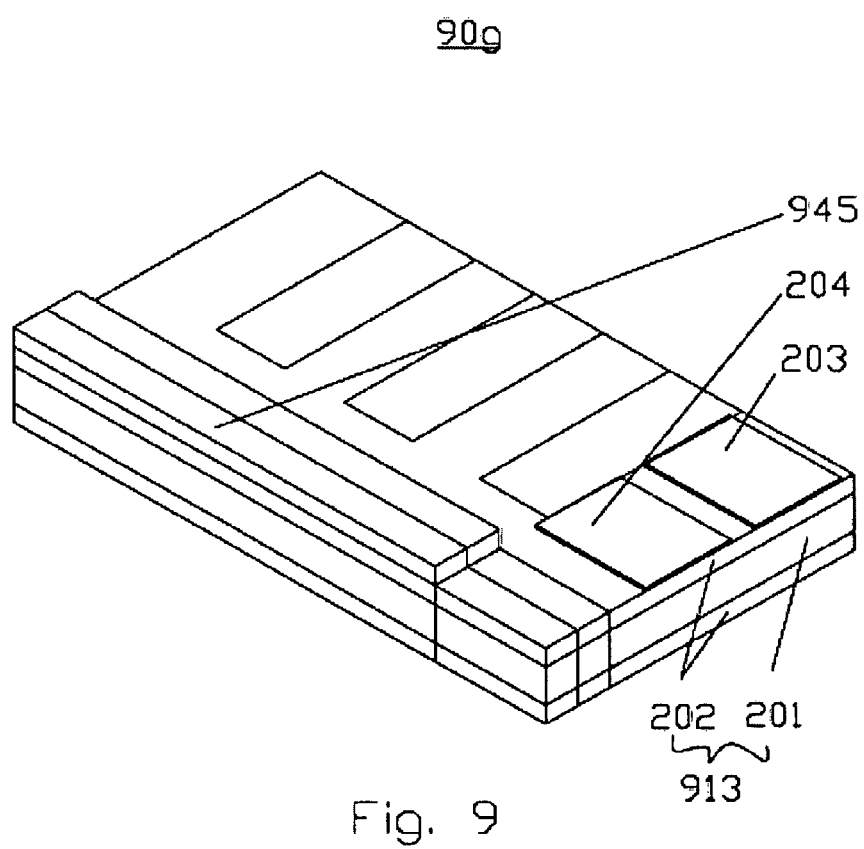
FIG. 9 is a perspective view of a PZT element according to a seven embodiment of the invention.

FIG. 9 illustrates still an alternative PZT element 90g according to an embodiment of the invention. The PZT element 90g is substantially similar in structure with respect to the PZT element 90f as shown in FIG. 8. Differently, a single support element 945 is positioned on an upper surface of a side portion of the laminated structure 913, which is parallel to the electrode layers 202 and the PZT layer 201 of the laminated structure 913.

FIG. 10a illustrates a schematic view of an electrical connection of the PZT element 90a shown in FIG. 3a, and the polarized directions 801 of the adjacent PZT layers 201 are opposite. However, it is understandable that the electrical connection shown in FIG. 10a may also be applied to the PZT elements 90b-90g shown in FIGS. 4-9.

Referring to FIG. 10a, one of the two electrode layers 202 is set to an electrical voltage via the conductive terminal 203, and another is grounded (GND) via the conductive terminal 204. As such, the polarity of voltage applied on each of the PZT layers 201 is opposite to the polarized direction 801 of the PZT layer 201 so as to make all the PZT layers 201 contract or expand simultaneously.

FIG. 10b illustrates a schematic view of another electrical connection of the PZT element 90a shown in FIG. 3a, the conductive terminal 203 is grounded and the conductive terminal 204 is set to a voltage V. As such, the polarity of voltage applied on each of the PZT layer 201 is consistent with the polarized direction 801 of the PZT layer 201 so as to make all the PZT layers 201 expand and contract simultaneously.

FIG. 10c illustrates a typical connection between the electrode layers 202 shown in FIG. 3a. In an exemplary embodiment, every adjacent electrode layers 202 are not electrically connected, but every two electrode layers 202 at intervals are electrically connected with each other by a conductive layer provided therebetween.

Figure 11:
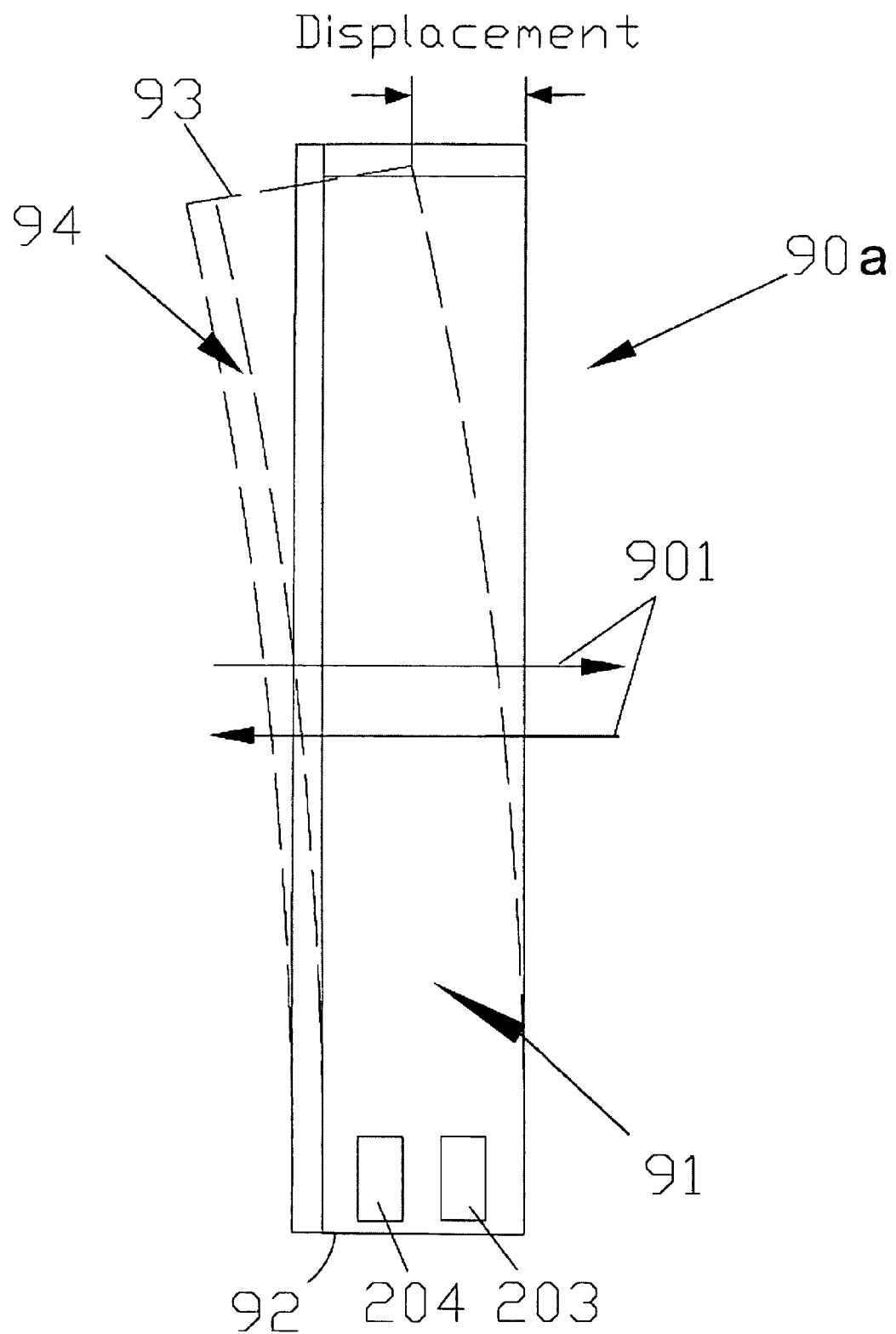

FIG. 11 illustrates an operating state of the PZT element 90a as shown in FIG. 3a. When the laminated structure 91, i.e. the PZT layers 201 (see FIG. 3a) are applied with a voltage, they will contract or expand simultaneously. However, because the support element 94 has a suitable rigidity to restrict the contract or expand of the PZT layers 201, so the contract or expand of the PZT layers 201 will exert a counterforce to the support element 94 and make the support element 94, together with the PZT element 90a bend towards a latitudinal direction thereof, i.e. a width direction 901 thereof, which is parallel to the PZT layers 201. In the invention, the PZT element 90a has an end 92 fixed to a rigid support part, such as a suspension 30 as shown in FIG. 12, and a free end 93 to produce a displacement to precisely control position of an object, such as a slider, and a detail operation of the PZT element 90a is believed to be within the purview of those in the art without further discussion.

In the invention, a method of manufacturing a PZT element comprises the following steps: 1) forming a laminated structure by laminating electrode layer and PZT layer alternatively in a thickness direction so as to make each PZT layer being sandwiched between two adjacent electrode layers; 2) attaching at least one support element on a side portion of the laminated structure to make the at least one support element substantially extend along a longitudinal direction of the laminated structure. In an embodiment of the invention, the support element is attached on a side surface of the laminated structure, which is parallel to the thickness direction of the piezoelectric element. In another embodiment of the invention, forming the support element comprises the steps of: forming an insulative layer and a support layer on the insulative layer; and bonding the insulative layer with the laminated structure together. In the invention, forming the laminated structure may further comprise a step of forming at least one notch or slot therein for bending the piezoelectric element easily.

Figure 12:
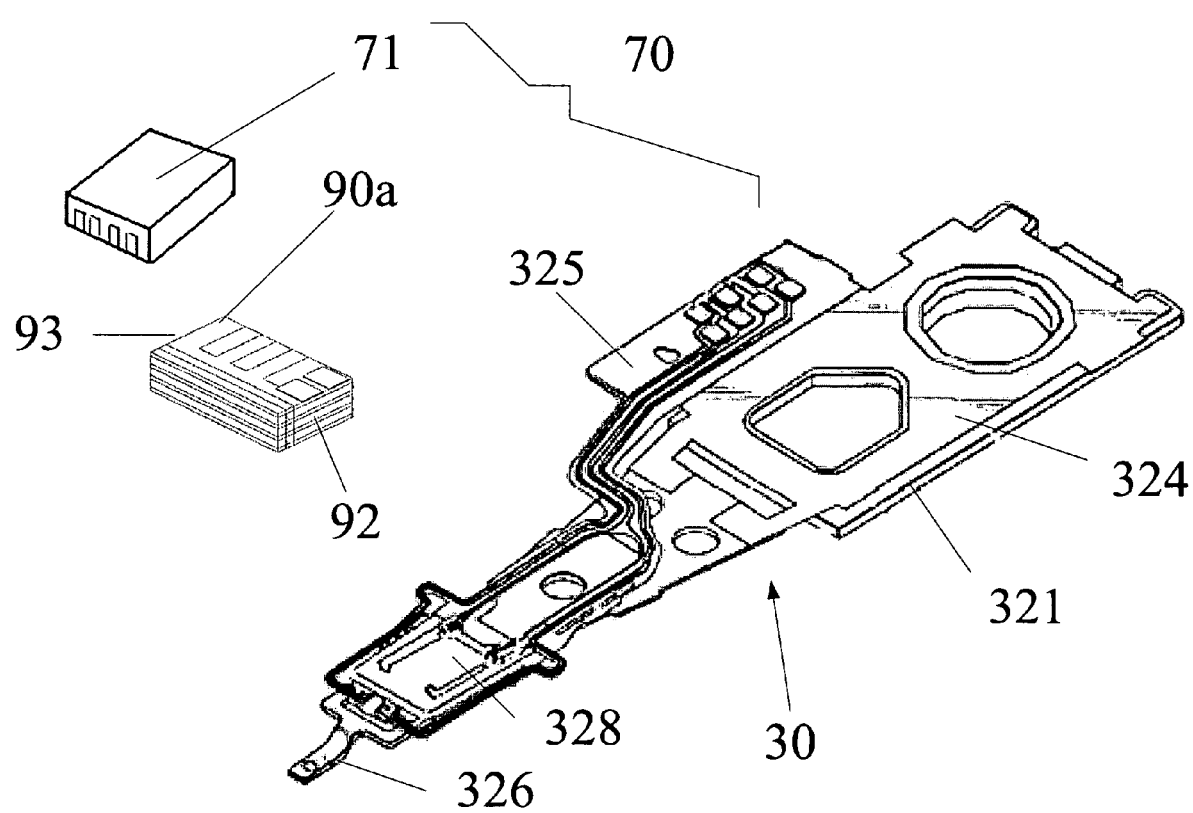
FIG. 12 is an exploded view of a HGA according to an embodiment of the invention.

Referring to FIG. 12, according to an embodiment of the invention, a HGA 70 comprises a slider 71, the PZT element 90a, and a suspension 30 to support the slider 71 and the PZT element 90a. The suspension 30 comprises a base plate 321, a hinge 324, a flexure 325 and a load beam 326, which are assembled together. The flexure 325 has a suspension tongue 328 for mounting the PZT element 90a thereon. Specifically, the end 92 of the PZT element 90a may be fixed on the suspension 30, and the free end 93 may be used to precisely adjust the position of the slider 71. Understandably, other PZT elements of the embodiments of the invention can also be applicable to a suitable HGA.

Figure 13:
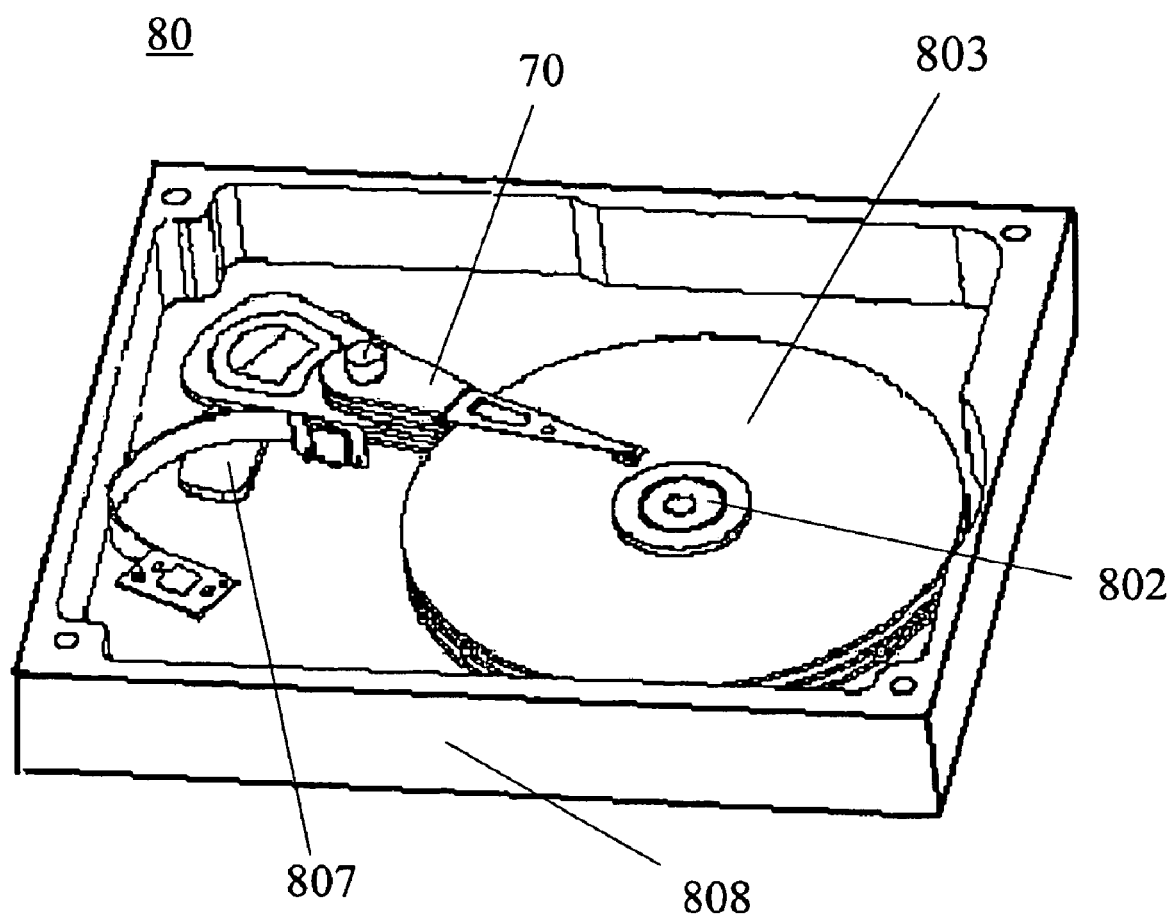
FIG. 13 is an exploded view of a disk drive unit according to an embodiment of the invention.

According to an embodiment of the invention, referring to FIG. 13, a disk drive unit 80 can be attained by assembling a housing 808, a disk 803, a spindle motor 802, a VCM 807 with the HGA 70 of the present invention. Because the structure and/or assembly process of disk drive unit of the present invention are well known to persons ordinarily skilled in the art, a detailed description of such structure and assembly is omitted herefrom.

However, it is contemplated that the present invention is applicable, not only to magnetic disk units, such as the magnetic disk unit shown in FIG. 13, but to other forms of devices as well, such as, but not limited to, optical disk drivers which utilizes actuators to adjust the position of optical heads. Therefore, the magnetic disk unit shown in FIG. 13 is provided by way of illustration rather than limitation, and accordingly there is no intention to limit application of the present invention to any particular devices, such as the magnetic disk unit.

While the invention has been described in terms of various specific embodiments, those skilled in the art will recognize that the invention can be practiced with modification within the spirit and scope of the claims.

What is claimed is:

1. A piezoelectric element comprising:
   a laminated structure which is laminated with electrode layer and piezoelectric layer alternatively to define a thickness direction; wherein each piezoelectric layer is sandwiched between two adjacent electrode layers; and
   at least one support element provided on a side portion of the laminated structure and substantially extending along a longitudinal direction thereof;
   wherein the support element comprises an insulative layer and a support layer provided on the insulative layer, and the insulative layer is sandwiched between the support layer and the laminated structure, and the support element has a rigidity suitable to restrict the contraction or expansion of the piezoelectric layer such that the piezoelectric element is bent at least towards a latitudinal direction thereof when an electrical voltage is applied thereto through the electrode layers.

2. The piezoelectric element in accordance with claim 1, wherein the support element is provided on a side surface of the laminated structure, which is parallel to the thickness direction of the piezoelectric element.

3. The piezoelectric element in accordance with claim 1, wherein the laminated structure further comprises at least one notch or slot therein for bending piezoelectric element easily.

4. A head gimbal assembly comprising:
   a slider;
   a piezoelectric element; and a suspension to support the slider and the piezoelectric element;

wherein the piezoelectric element comprises:

a laminated structure which is laminated with electrode layer and piezoelectric layer alternatively to form a thickness direction; wherein each piezoelectric layer is sandwiched between two of the electrode layer; and at least one support element provided on one side portion of the laminated structure and substantially extending along a longitudinal direction thereof;

wherein the support element comprises an insulative layer and a support layer provided on the insulative layer, and the insulative layer is sandwiched between the support layer and the laminated structure, and the piezoelectric element is sandwiched between the slider and the suspension, and the support element has a rigidity suitable to restrict the contraction or expansion of the piezoelectric layer such that the piezoelectric element is bent at least towards a latitudinal direction thereof when an electrical voltage is applied thereto through the electrode layers.

5. The head gimbal assembly in accordance with claim 4, wherein the support element is provided on a side surface of the laminated structure, which is parallel to the thickness direction of the piezoelectric element.

6. The head gimbal assembly in accordance with claim 4, wherein the laminated structure further comprises at least one notch or slot therein for bending piezoelectric element.

7. A method of manufacturing a piezoelectric element comprising the following steps:

forming a laminated structure by laminating electrode layer and piezoelectric layer alternatively in a thickness direction so as to make each piezoelectric layer being sandwiched between two adjacent electrode layers;

attaching at least one support element having a suitable rigidity on a side portion of the laminated structure to make the at least one support element substantially extend along a longitudinal direction of the laminated structure;

wherein forming the support element comprises: forming an insulative layer and a support layer on the insulative layer, and bonding the insulative layer with the laminated structure.

8. The method in accordance with claim 7, wherein the support element is attached on a side surface of the laminated structure, which is parallel to the thickness direction of the piezoelectric element.

9. The method in accordance with claim 7, wherein forming the laminated structure further comprises a step of forming at least one notch or slot therein for bending the piezoelectric element easily.

10. A disk drive unit, comprises:

a head gimbal assembly;

a drive arm to connect with the head gimbal assembly;

a disk; and a spindle motor to spin the disk; wherein the head gimbal assembly comprising:

a slider;

a piezoelectric element; and a suspension to support the slider and the piezoelectric element;

wherein the piezoelectric element comprises:

a laminated structure which is laminated with electrode layer and piezoelectric layer alternatively to form a thickness direction; wherein each piezoelectric layer is sandwiched between two of the electrode layer; and at least one support element provided on one side portion of the laminated structure and substantially extending along a longitudinal direction thereof;

wherein the piezoelectric element is sandwiched between the slider and the suspension, the support element comprises an insulative layer and a support layer provided on the insulative layer, and the insulative layer is sandwiched between the support layer and the laminated structure, and the support element has a rigidity suitable to restrict the contraction or expansion of the piezoelectric layer such that the piezoelectric element is bent at least towards a latitudinal direction thereof when an electrical voltage is applied thereto through the electrode layers.

* * * * *